(12) United States Patent
Pellenc et al.

(10) Patent No.: US 10,716,258 B2
(45) Date of Patent: Jul. 21, 2020

(54) MOWER HAVING A PARKING BRAKE

(71) Applicant: PELLENC, Pertuis (FR)

(72) Inventors: Roger Pellenc, Pertuis (FR); Jean-José Zarco, Le Puy Ste Reparade (FR)

(73) Assignee: PELLENC, Pertuis (FR)

(*) Notice: Subject to any disclaimer, the term of this patent is extended or adjusted under 35 U.S.C. 154(b) by 69 days.

(21) Appl. No.: 16/082,353

(22) PCT Filed: Mar. 22, 2017

(86) PCT No.: PCT/FR2017/050667
§ 371 (c)(1),
(2) Date: Sep. 5, 2018

(87) PCT Pub. No.: WO2017/182725
PCT Pub. Date: Oct. 26, 2017

(65) Prior Publication Data
US 2019/0059228 A1 Feb. 28, 2019

(30) Foreign Application Priority Data

Apr. 18, 2016 (FR) ...................................... 16 53395

(51) Int. Cl.
*A01D 69/10* (2006.01)
*A01D 34/82* (2006.01)
(Continued)

(52) U.S. Cl.
CPC ............. *A01D 69/10* (2013.01); *A01D 34/74* (2013.01); *A01D 34/82* (2013.01); *A01D 34/828* (2013.01); *A01D 2101/00* (2013.01)

(58) Field of Classification Search
CPC .... A01D 69/10; A01D 2101/00; A01D 37/74; A01D 37/82; A01D 37/828; A01D 37/00; A01D 37/001; A01D 37/6812
See application file for complete search history.

(56) References Cited

U.S. PATENT DOCUMENTS 4,068,452 A * 1/1978 Schaefer ................ A01D 69/10
192/224.2
4,120,136 A * 10/1978 Rose ..................... A01B 59/044
56/15.8

(Continued)

FOREIGN PATENT DOCUMENTS

| EP | 0243560 A1 | 11/1987 |
| WO | 2010/030280 A1 | 3/2010 |
| WO | 2014/149737 A1 | 9/2014 |

OTHER PUBLICATIONS

International Search Report for PCT/FR2017/050667.
IPRP for PCT/FR2017/050667.

*Primary Examiner* — Alicia Torres
*Assistant Examiner* — Adam J Behrens
(74) *Attorney, Agent, or Firm* — Egbert Law Offices, PLLC

(57) ABSTRACT

A mower having a chassis, wheels for moving the mower in a mowing plane, and a cutting deck. The mower includes a parking brake having at least one brake member secured to the cutting deck. The cutting deck is mounted on the chassis so as to be able to move between at least one mowing position and a position in which the mower is stopped, in which the brake member comes into contact with at least one wheel of the mower so as to immobilize the wheel. The invention is intended in particular for use with mowers of the walk-behind or ride-on type, and with robotic mowers.

17 Claims, 3 Drawing Sheets

(51) Int. Cl.
    *A01D 34/68*     (2006.01)
    *A01D 34/74*     (2006.01)
    *A01D 101/00*     (2006.01)

(56) References Cited

U.S. PATENT DOCUMENTS

| | | | | |
|---|---|---|---|---|
| 4,322,935 | A * | 4/1982 | Poehlman | A01D 34/6812 192/18 R |
| 5,542,241 | A * | 8/1996 | Lydy | A01D 34/6812 180/19.3 |
| 6,199,354 | B1 * | 3/2001 | King | A01D 34/6812 56/11.3 |
| 6,530,200 | B1 * | 3/2003 | Minoura | A01D 34/64 56/15.2 |
| 2004/0154278 | A1 * | 8/2004 | Samejima | A01D 34/64 56/14.7 |
| 2011/0083412 | A1 * | 4/2011 | Jackson | A01D 69/10 56/11.3 |

* cited by examiner

MOWER HAVING A PARKING BRAKE

TECHNICAL FIELD OF THE INVENTION

The present invention relates to an agricultural mower provided with a brake, more specifically a parking brake.

An agricultural mower is understood to mean a lawn mower or trimmer that can be used for the maintenance of green spaces. Such mower can be intended for professional use for the maintenance of public or private green spaces, or for domestic use for the maintenance of parks and gardens. A parking brake is understood to mean a brake capable of being actuated to immobilize the mower when not in use. The brake can especially be used to secure the mower parked on an incline, or to immobilize it on a vehicle during transport.

The invention has applications for walk-behind mowers, riding mowers, remote operator mowers, or self-operated mowers.

Finally, the invention has applications for both electric motor mowers and heat engine mowers.

STATE OF PRIOR ART

Document WO20101030280 relates to a walk-behind mower provided with a parking brake comprising a brake member acting against a tire of a wheel of the mower.

In addition, document WO2014/149737 relates to a riding mower provided with a parking brake pedal acting on the rotation axis of the rear wheels of the mower.

SUMMARY OF THE INVENTION

The purpose of the present invention is to propose a mower with a simple and reliable parking brake.

A further purpose is to propose an economical parking brake that requires only very few additional components compared to a mower without such brake.

A further purpose is to propose a mower with an electrically or manually operated parking brake, to actuate the brake while securing the mower.

In order to achieve these goals, the invention relates more specifically to a mower comprising a chassis, wheels to move the mower according to a mowing plane, and a cutting deck.

According to the invention, the mower is provided with a parking brake having at least one brake member integral with the cutting deck. The cutting deck is movably mounted on the chassis between at least one mowing position and one immobilizing position of the mower, wherein the brake member comes into contact with at least one wheel of the mower to immobilize said wheel.

The mowing plane is understood to mean a plane parallel to which the mower can move when all its wheels are in contact with the ground. It is also a plane according to which the mower is capable of cutting plants when all its wheels rest on the ground. The mowing plane is an horizontal plane when the wheels of the mower rest on horizontal and plane ground.

The brake member is considered to immobilize the wheel when it prohibits its rotation by form-fit, or when it applies pressure on the wheel to prevent the mower from moving, especially on an incline, under the effect of its own weight.

Several brake members may be provided on the cutting deck to come into contact with several wheels of the mower. In particular, the mower may be provided with two rear wheels having a fixed rotation axis relative to the chassis, and the cutting deck may comprise two brake members respectively associated with the two rear wheels.

"Fixed" rotation axis means the rotation axis of a non-pivoting wheel. The front wheels may be pivoting or non-pivoting wheels. A pivoting wheel means a wheel with a rotation axis substantially parallel to the mowing plane and a pivot axis substantially perpendicular to the mowing plane. i.e. substantially vertical.

According to alternative embodiments, the brake members can also be linked to one or more front wheels of the mower.

The one or more brake members are configured to cooperate with the wheel when the cutting deck is in the immobilizing position, to immobilize the wheel. Cooperation between the brake member and the wheel can take place directly or via an additional member rotationally integral with the wheel. In particular, the one or more brake members can be configured to cooperate with one of a rim, a hub, a drum integral with the rim or the hub, and a tread of the wheel. The tread may be formed by a tire fitted on the wheel.

The brake member may, for example, comprise a pad or a pin capable of coming into contact with the wheel.

The brake member is preferably a member rigidly integral with the cutting deck.

According to one possible implementation of the invention, the cutting deck may have a freedom of movement between the mowing position and the immobilizing position, with a component parallel to the mowing plane.

In other words, the cutting deck can move, in this case, forward and backward relative to the chassis, between the mowing position, or one of several mowing positions, and the immobilizing position.

When the brake is configured to immobilize the rear wheels, such immobilization is done in this case by moving the cutting deck backwards.

According to another possible implementation of the invention, not exclusive of the preceding, the cutting deck may also have a freedom of movement between the mowing position and the immobilizing position, with a component perpendicular to the mowing plane.

In other words, the cutting deck can move, in this case, up and down, relative to the chassis. When the mower rests on a horizontal surface, this corresponds to a vertical component of the movement. The up and down movement incidentally is used to set a cutting height in the one or more mowing positions.

Still according to this particular embodiment, the immobilizing position is preferably a high position at maximum stroke of the cutting deck relative to the chassis, and thus in the position nearest to the chassis, or a low position at maximum stroke, and thus in the position farthest to the chassis.

According to a further possible implementation of the invention, the cutting deck may have a freedom of movement between the mowing position and the immobilizing position, with a component parallel to the mowing plane and a component perpendicular to the mowing plane, the parallel and perpendicular components being linked.

In other words, the cutting deck can move, in this case, concomitantly up and down and forward and backward.

Although it might be possible to consider a high immobilizing position, the immobilizing position is preferably a low position of the cutting deck, i.e. a position lower than the lowest mowing position. An immobilizing position of mower with a cutting deck at the bottom of its stroke relative to the chassis, and therefore close to the ground, offers a number of advantages.

It lowers the center of gravity of the parked mower and reduces access to the one or more blades housed inside the cutting deck.

The mower can advantageously comprise one of a suspension ramp or parallelogram to hang the cutting deck from the chassis. These members allow for relative movement of the cutting deck in relation to the chassis in a movement comprising linked components parallel and perpendicular to the cutting plane, as described above.

In order to activate the shifting of the cutting deck from the mowing position to the immobilizing position, and possibly between mowing positions of different heights, the mower may comprise a manual mechanism to shift the cutting deck between the mowing position and the immobilizing position. One single lever can be provided both to adjust the cutting height of the mower by selecting a mowing position, and to apply the parking brake by selecting the immobilizing position.

Depending on the mower configuration, proper contact between the brake member and the mower wheel in the immobilizing position can be ensured to be maintained by the mere weight of the cutting deck or by a form-fit between the brake member and the wheel. However, for added safety, the mower may also be provided with a latch configured to lock the cutting deck in the immobilizing position. Such latch ensures the quality of contact between the brake member and the wheel or wheels of the mower and prevents any inadvertent release of the parking brake.

The latch may advantageously be an indexed latch, further configured to lock the cutting deck in several mowing positions, including mowing positions corresponding to different cutting heights of the mower.

In order to facilitate the setting of a cutting height and the actuation of the parking brake, the mower may further comprise an actuator configured to shift the cutting deck between a continuous range of positions and the immobilizing position. Whenever the mower is an electric mower, the actuator is preferably an electric actuator. For larger mowers, a hydraulic actuator can also be considered.

The mower according to the invention can indeed be an electric mower. In this case, it may comprise at least one electric motor driving at least one cutting blade of the cutting deck.

The mower may also comprise at least one electric motor for the forward movement of the mower, coupled to the rear wheels.

Power for the motors driving the blade and moving the mower forward can be supplied by an electric accumulator battery.

The following description with reference to the drawing figures shows other characteristics and advantages of the invention. This description is given for illustration purposes and is not limiting.

DETAILED DESCRIPTION OF MODES OF IMPLEMENTATION OF THE INVENTION

Figure 1:
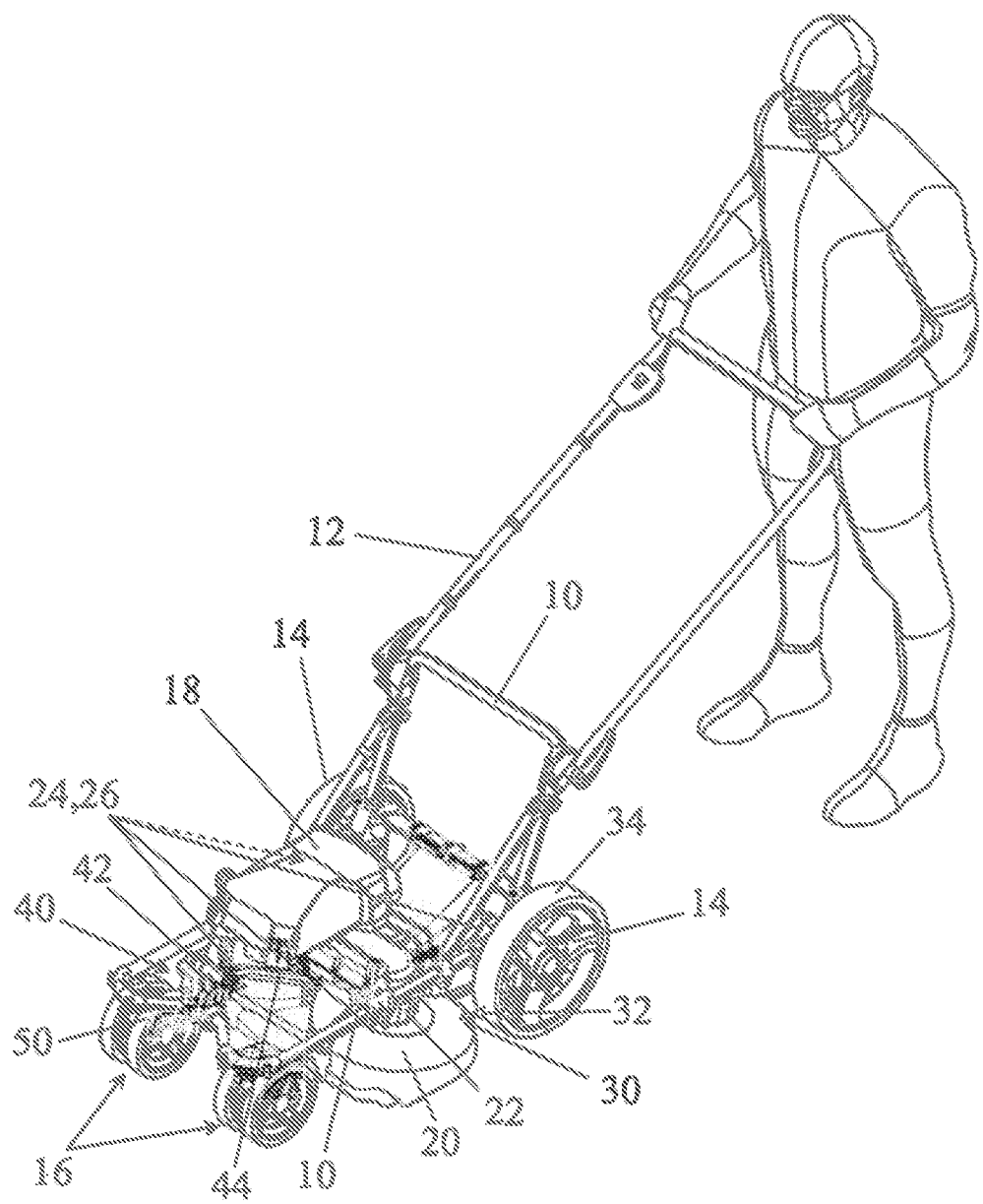
FIG. 1 is a perspective view of a mower according to the invention, shown in a mowing position, and comprising a manual actuation mechanism for a parking brake.

FIG. 1 shows a walk-behind type electric mower in a mowing position. It comprises a tubular chassis 10 on which various mower members are mounted.

A folding handle bar 12, non-pivoting rear wheels 14, pivoting front wheels 16, a power supply battery 18, and a cutting deck 20 are among the members mounted on the chassis 10. For simplification purposes of the figure, other accessories of the mower, such as a grass clippings catcher, are not shown.

The terms "front" and "rear" refer to the normal moving direction of the mower when running, the mower operator walking behind the mower.

In the shown example, the chassis 10 is arranged substantially parallel to the mowing plane of the mower, i.e. substantially horizontally when the mower rests on its wheels and on level ground.

The rear wheels 14 are integral with the chassis with a freedom of rotation about an axis also parallel to the mowing plane. These are drive wheels coupled to an electric motor not shown in FIG. 1. The front wheels 16, arranged in pairs, have freedom of rotation about an axis substantially parallel to the mowing plane and freedom of pivot about an axis substantially perpendicular to the mowing plane.

The cutting deck 20 is basically located under the chassis 10 between the front wheels 16 and the rear wheels 14. It houses one or more cutting blades not visible on the figure. These blades are driven by an electric motor 22 integral with the cutting deck.

The cutting deck 20 is mounted on the chassis 10 via a suspension parallelogram 24, in this example, composed of four link rods 26, three of which are at least partially visible in the figures. The link rods 26 are articulated both on the chassis 10 and on the cutting deck 20 and thereby confer to the cutting deck 20 relative to the chassis 10.

The cutting deck 20 can also be displaced in relation to the chassis in a movement that comprises both a component perpendicular to the mowing plane, and a component parallel to the mowing plane.

In the following description, and for simplification purposes, the displacement perpendicular to the mowing plane is designated as vertical displacement and the displacement parallel to the mowing plane is designated as horizontal displacement, referring to a mower with the wheels resting on plane and horizontal ground.

The vertical displacement component of the cutting deck relative to the chassis is used to adjust the cutting height of the mower by bringing the cutting deck closer to or farther from the ground.

The vertical displacement of the cutting deck can be indexed or not to define several mowing positions. This aspect is described in greater detail in the following description, especially with reference to FIG. 2.

The vertical displacement of the cutting deck is accompanied by a pivoting of the link rods in relation to the chassis and thus by a horizontal displacement, linked to the vertical displacement.

In the shown example of embodiment, the articulation point of each link rod on the chassis is located behind the articulation point of the same link rod on the cutting deck.

Thus, lowering the cutting deck 20 relative to the chassis 10 toward the ground is accompanied by a displacement of the cutting deck 20 toward the back, closer to the rear wheels 14.

This movement is used in the execution of a parking brake. The cutting deck 20 does indeed comprise brake members 30 capable of engaging with the rear wheels 14 in the immobilizing position. A single brake member or one brake member for each rear wheel may be provided. Operation can be seen in FIGS. 2 and 3.

Figure 2:
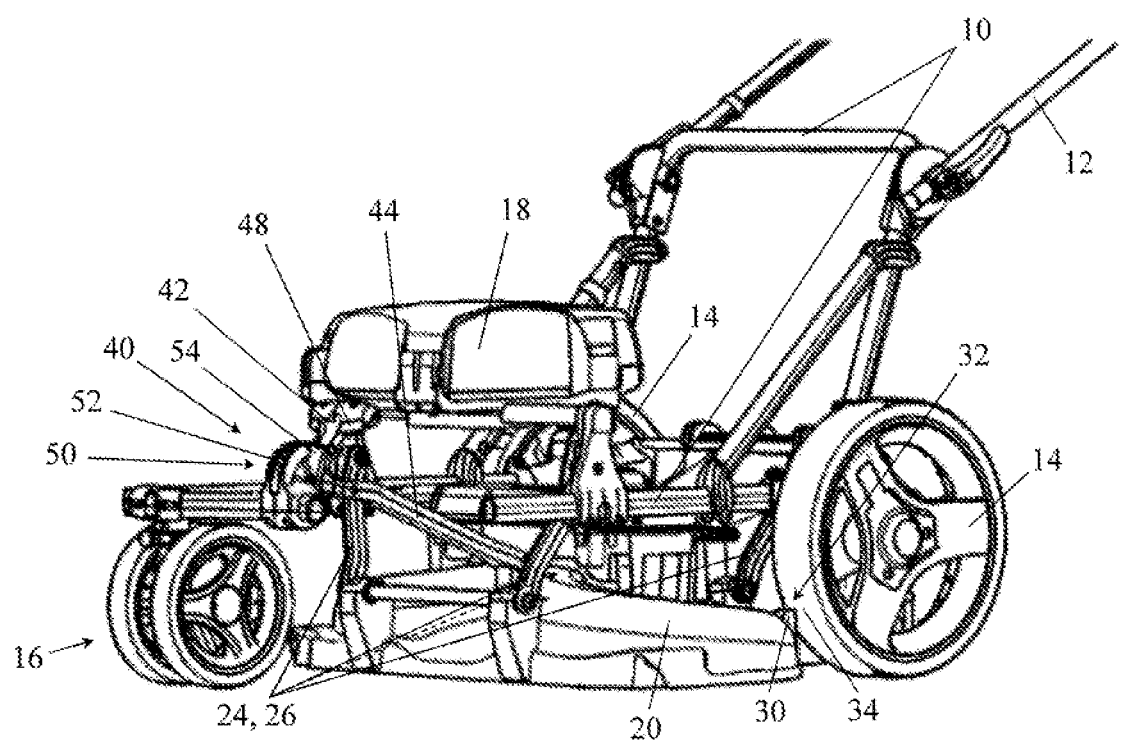
FIG. 2 is a perspective view of the mower in FIG. 1, shown in immobilizing position, the left front part of the mower being torn off to show an actuation mechanism for a parking brake and a latch for a parking brake. The figure also shows a brake member.

FIG. 2 shows the cutting deck in the immobilizing position. As shown in FIG. 2, the cutting deck 20 extends in front of the rear wheels 14 and has a brake member 30. The brake member 30 comprises a contact end 32, in contact with the tread 34 of a rear wheel 14. It is positioned on the cutting deck close to that wheel so that a slight displacement of the cutting deck 20 towards the back, as permitted by the link rods 26, enables the contact end 32 of the brake member 30 to engage with the tread 34 of the wheel 14. More specifically, in the shown example, the contact end 32 of the brake member 30 engages into a relief of the tread 34 or bears on said tread. The contact end 32 may also consist of a pad capable of engaging with the tread.

The position of the cutting deck in which the brake member is applied against the wheel is the immobilizing position. In this position, the brake member prohibits or at least makes more difficult the rotation of the wheel against which it bears. The brake member 30 and the portion of the wheel with which it interacts in the immobilizing position thus make up a parking brake.

A similar brake member, not visible in FIG. 2, may be provided for the other rear wheel.

FIG. 2 also shows an adjustment mechanism 40 for the position of the cutting deck 20 relative to the chassis.

The adjustment mechanism 40 comprises a pivoting adjustment lever 42 connected to the cutting deck 20 through an articulated connecting rod 44 on the cutting deck and the adjusting lever. The adjusting lever 42 can be actuated manually to change the mowing position or to engage or release the immobilizing position.

The adjustment mechanism 40 also comprises a locking pin, not shown in the figure, integral with the adjusting lever 42 and associated with an indexing comb 50. The indexing comb 50 comprises a plurality of indexed positions, in the form of notches 52, with which the return spring-loaded locking pin, not shown, can mesh.

A relative position of the cutting deck 20 relative to the chassis 10 and a cutting height of the mower correspond to each notch 52.

The indexing comb 50 comprises also a notch or a stop 54 designed to lock the adjustment mechanism, and through this mechanism, the cutting deck in the immobilizing position in which the one or more brake members are applied against the wheels.

The locking pin can be released from the notches 52 or from the stop 54 by pressing on a handle 48 of the adjusting lever 42, counter to the return spring. This releases the adjusting lever to change the mowing position, engage the immobilizing position or release the immobilizing position.

FIG. 2 shows the adjusting lever 42 in the position that corresponds to the immobilizing position, the locking pin cooperating with the stop 54.

Figure 3:
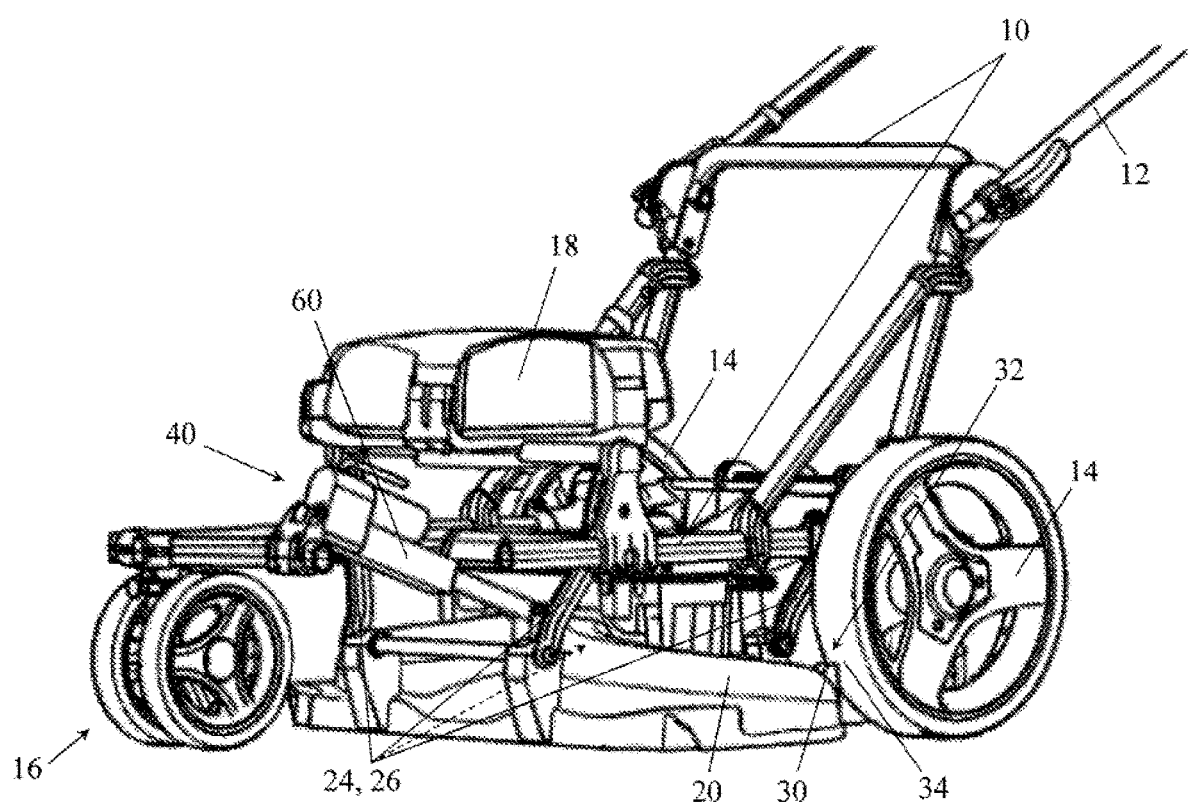
FIG. 3 is a perspective view of a mower according to the invention, comprising an electric actuation mechanism for a parking brake. To this end and as shown in FIG. 2, the left front part of the mower is torn off to show such mechanism.

FIG. 3 shows an alternative embodiment of an adjustment mechanism 40 in which the adjusting lever is replaced by an electric actuator 60. The electric actuator can then be used both for shifting the cutting deck between various mowing positions and the immobilizing position, and for locking the various positions.

Whenever an actuator is used, the mowing positions are not necessarily indexed as the height of the cutting deck relative to the chassis can be adjusted continuously.

The invention claimed is:

1. A mower comprising:
   a chassis;
   a plurality of wheels cooperative with said chassis and adapted to move said chassis along a mowing plane;
   a cutting deck movably mounted on said chassis between at least one mowing position and one immobilizing position; and
   a parking brake having at least one brake member integral with said cutting deck, the at least one brake member contactable with at least one wheel of said plurality of wheels so as to immobilize the at least one wheel when said cutting deck is moved from the at least one mowing position to the one immobilizing position.

2. The mower of claim 1, said plurality of wheels comprising a pair of rear wheels having a fixed axis of rotation relative to said chassis, the at least one brake member comprising a pair of brake members respectively contactable with the pair of rear wheels so as to immobilize the pair of rear wheels.

3. The mower of claim 1, wherein said cutting deck has a freedom of movement between the at least one mowing position and the one immobilizing position, said cutting deck having a component of movement parallel to the mowing plane.

4. The mower of claim 1, wherein said cutting deck has a freedom of movement between the at least one mowing position and the one immobilizing position, said cutting deck having a component of movement perpendicular to the mowing plane.

5. The mower of claim 1, wherein said cutting deck has a freedom of movement between the at least one mowing position and the one immobilizing position, said cutting deck having a component of movement parallel to the mowing plane linked to another component of movement perpendicular to the mowing plane.

6. The mower of claim 4, wherein the one immobilizing position is at a lower position of said cutting deck.

7. The mower of claim 1, further comprising:
   a parallelogram suspending said cutting deck to said chassis.

8. The mower of claim 1, further comprising:
   a mechanism that manually shifts said cutting deck between the at least one mowing position to the one immobilizing position.

9. The mower of claim 1, further comprising:
   a latch cooperative with said cutting deck so as to selectively lock said cutting deck in the one immobilizing position.

10. The mower of claim 9, wherein the at least one mowing position comprises a plurality of mowing positions, wherein said latch is an indexed latch, the indexed latch configured to lock said cutting deck in one of the plurality of mowing positions.

11. The mower of claim 1, further comprising:
   an actuator cooperative with said cutting deck so as to shift said cutting deck between the at least one mowing position and the one immobilizing position.

12. The mower of claim 1, wherein the at least one brake member is a pad.

13. The mower of claim 1, wherein the at least one brake member is a lug.

14. The mower of claim 1, wherein said at least one brake member cooperates with one of the a rim, a hub and a tread of the at least one wheel.

15. The mower of claim 1, wherein said cutting deck has at least one cutting blade, the mowing further comprising:
   an electric motor drivingly connected to the at least one cutting blade.

16. The mower of claim 2, further comprising:
   an electric motor coupled to the pair of rear wheels and adapted to move the mower forward.

17. The mower of claim 5, wherein the one immobilizing position is at a lower position of said cutting deck.

\* \* \* \* \*